United States Patent [19]

Lynch et al.

[11] 4,253,923

[45] Mar. 3, 1981

[54] ELECTROLYTIC PROCESS FOR PRODUCING POTASSIUM HYDROXIDE

[75] Inventors: Richard W. Lynch, Chattanooga; Garland E. Hilliard; Ronald L. Dotson, both of Cleveland, all of Tenn.

[73] Assignee: Olin Corporation, New Haven, Conn.

[21] Appl. No.: 44,749

[22] Filed: Jun. 1, 1979

[51] Int. Cl.³ .......................... C25B 1/34; C25B 1/02; C25B 13/02; C25B 13/08

[52] U.S. Cl. ...................................... 204/98; 204/128; 204/129; 204/296

[58] Field of Search .................. 204/98, 128, 296, 129

[56] References Cited

U.S. PATENT DOCUMENTS

| | | | |
|---|---|---|---|
| 3,770,567 | 11/1973 | Grot | 428/286 |
| 3,976,549 | 8/1976 | Falvo | 204/98 |
| 4,062,743 | 12/1977 | Ahn et al. | 204/98 |
| 4,085,071 | 4/1978 | Resnick et al. | 204/98 |

OTHER PUBLICATIONS

Webster's 7th New Collegiate Dictionary, 1967, p. 473.

*Primary Examiner*—R. L. Andrews
*Attorney, Agent, or Firm*—Donald F. Clements; James B. Haglind

[57] ABSTRACT

Current efficiency in an electrolytic membrane cell for the production of concentrated potassium hydroxide is considerably increased by employing in the electrolytic membrane cell a membrane selected from a group consisting of an amine modified perfluorosulfonic acid membrane such as a primary amine, diamine, or polyamine modified perfluorosulfonic acid membrane, and a laminated perfluorosulfonic acid acid membrane, and a laminated perfluorosulfonic acid membrane comprised of at least two unmodified perfluorosulfonic acid membranes of different thickness and different equivalent weight.

23 Claims, No Drawings

ELECTROLYTIC PROCESS FOR PRODUCING POTASSIUM HYDROXIDE

This invention relates to a process for the electrolytic production of chlorine and potassium hydroxide. Potassium hydroxide is used in the manufacture of soft soap, alkaline batteries, and in the production of textiles and the fabrication of rubber.

Commercially, potassium hydroxide is produced in electrolytic cells employing asbestos diaphragms as a product liquor containing 10-15 percent KOH and about 10 percent KCl. The liquor is concentrated by evaporation while crystallizing out KCl to provide a concentrated solution containing about 45 percent KOH and containing about 1 percent KCl.

U.S. Pat. No. 3,733,634, issued to A. J. Stacey and R. L. Dotson on Nov. 20, 1973, describes a process for electrolyzing aqueous sodium chloride having a concentration in the range of 120-150 grams per liter in the anolyte to produce sodium hydroxide where the concentration is held in the range of 31-43 percent. When, however, the concentration of sodium chloride in the anolyte is in excess of 250 grams per liter, the caustic concentration became unstable and there is a continuous increase in caustic concentration. This increasing concentration, however, is accomplished by decreased current efficiency. The cell employs hydraulically impervious cation-permselective membranes such as the unmodified perfluorosulfonic acid membranes.

U.S. Pat. No. 4,062,743, issued to Byung K. Ahn and Ronald L. Dotson on Dec. 31, 1977, discloses a process for improving the reactant efficiency in an electrolytic membrane cell for the production of potassium hydroxide from aqueous solutions of potassium chloride by maintaining the anolyte concentration of potassium chloride at 250 to 350 grams per liter and the catholyte concentration of potassium hydroxide from about 410 to about 480 grams per liter. The electrolytic cell employs an unmodified permselective membrane comprised of a copolymer of a perfluoroolefin and a fluorosulfonate. However, a catholyte current efficiency of 87 percent maximum was achieved at a concentration of potassium hydroxide of about 450 grams potassium hydroxide per liter.

There is a remaining need for an electrolytic membrane process for producing high purity potassium hydroxide at high KOH concentrations with significantly improved current efficiencies using concentrated potassium chloride brine.

OBJECTS

It is a primary object of this invention to provide an improved electrolytic process having a high current efficiency for preparing potassium hydroxide.

It is another object of the present invention to provide a process for producing chlorine, hydrogen and potassium hydroxide with reduced energy costs.

A further object of the present invention is to provide a process for producing potassium hydroxide of a high purity.

These and other objects of the invention will become apparent from the following description and the appended claims.

BRIEF DESCRIPTION OF THE INVENTION

The aforementioned and other objects are achieved in a process for the preparation of potassium hydroxide, chlorine, and hydrogen in an electrolytic cell by the electrolysis of potassium chloride brine, the cell having an anolyte chamber containing an anode and a catholyte chamber containing a cathode and wherein the anolyte chamber is separated from the catholyte chamber by a cationic permselective membrane, the improvement which comprises employing as said membrane a membrane selected from a group consisting of an amine substituted perfluorosulfonic acid membrane and single film laminate membrane comprised of at least two perfluorosulfonic acid membranes laminates, wherein the potassium hydroxide concentration in the catholyte chamber is in the range from about 300 to about 500 grams potassium hydroxide per liter and wherein the membrane is laminated to a fabric of polytetrafluoroethylene and rayon.

DETAILED DESCRIPTION OF THE INVENTION

The electrolytic cell employed in this invention may be a commercially available or a custom-built electrolytic cell of a size and electrical capacity capable of economically producing the desired potassium hydroxide product.

A particularly advantageous electrolytic cell which may be employed in the practice of this process has separate anolyte and catholyte chambers, using as a separator a selected permselective cation exchange membrane. Located on one side of the membrane partition, the anolyte chamber has an outlet for by-product chlorine gas generated, and an inlet and an outlet for charging, removing, or circulating potassium chloride solution. On the opposite side of the membrane partition, the catholyte chamber has an inlet for water, an outlet for removing potassium hydroxide product and an outlet for removing by-product hydrogen liberated at the cathode by the electrolysis of water.

A gas disengaging space is generally located in each of the anolyte and catholyte chambers within the electrolytic cell.

The membrane cell can be operated on a batch or flow-through system. In the latter system, anolyte and catholyte are continuously circulated to and from external solution storage vessels.

Hydrogen gas is removed as formed from the catholyte chamber and collected for use as a fuel or otherwise disposed of. Any excess chlorine gas is likewise removed as formed from the anolyte chamber and collected.

Typical electrochemical cells which may be employed in the preparation of aqueous solutions of potassium hydroxide are disclosed in U.S. Pat. No. 4,062,743, supra, and hereby incorporated by reference in its entirety.

Several groups of materials are suitable for use as membranes in the process of this invention.

A first group of membranes includes amine substituted polymers such as diamine and polyamine substituted polymers of the type described in U.S. Pat. No. 4,030,988, issued on June 21, 1977 to Walther Gustav Grot and primary amine substituted polymers described in U.S. Pat. No. 4,085,071, issued on Apr. 18, 1978 to Paul Raphael Resnick et al. Both of the above patents are incorporated herein in their entirety by reference.

With reference to the diamine and polyamine substituted polymers of U.S. Pat. No. 4,030,988, supra, the basic precursor sulfonyl fluoride polymer of U.S. Pat. No. 4,036,714, issued on July 19, 1977 to Robert Spitzer, and incorporated herein in its entirety by reference, is first prepared and then reacted with a suitable diamine, such as ethylene diamine, or polyamine to a selected depth wherein the pendant sulfonyl fluoride groups react to form N-monosubstituted sulfonamido groups or salts thereof. The thickness of amine substituted polymers of the first group is in the range from about 4 to about 10 and preferably in the range from about 5 to about 9 mils.

The selected depth is typically in the range from about 1.0 to about 7.0 and preferably from about 1.2 to about 1.5 mils.

In preparing the basic precursor sulfonyl fluoride as described in the '714 patent above, the preferred copolymers utilized in the film are fluoropolymers or polyfluorocarbons although others can be utilized as long as there is a fluorine atom attached to the carbon atom which is attached to the sulfonyl group of the polymer. A preferred copolymer is a copolymer of tetrafluoroethylene and perfluoro (3,6-dixoa-4-methyl-7-octenesulfonyl fluoride) which comprises 10 to 60 and preferably 25 to 50 percent by weight of the latter. Surface sulfonyl groups are then converted to form diamine and octyamino groups or salts thereof through the reaction of the diamine, such as ethylene diamine.

With only surface conversion of the sulfonyl halide groups, further conversion of the remaining sulfonyl halide groups to the ionic form is most desirable. The prior art techniques of conversion of the—$SO_2X$ groups with X as chlorine or fluorine may be undertaken such as by hydrolysis. The techniques set forth in Connolly and Gresham, U.S. Pat. No. 3,282,875 and/or Grot, U.S. Ser. No. 178,782 and now U.S. Pat. No. 3,784,399 may be employed. Illustratively, the unconverted sulfonyl groups of the polymer may be converted to the form —$(—SO_2NH)_mQ$ wherein Q is H, $NH_4$, cation of an alkali metal and/or cation of an alkaline earth metal and m is the valence of Q. Additionally, the unconverted sulfonyl groups may be formed to —$(SO_3)_nMe$ wherein Me is a cation and n is the valence of the cation. Preferred definitions of Q include $NH_4$ and/or cation of an alkaline earth metal particularly sodium or potassium. Preferred definitions of Me include potassium, sodium and hydrogen.

As employed in the present context, a di- or polyamine is defined as an amine which contains at least two amino groups with one primary amino group and the second amino group either primary or secondary. Additional amino groups may be present so long as the above-defined amino groups are present.

Specific amines falling within the above definition are included within the disclosure in U.S. Pat. No. 3,647,086, issued to Mizutani et al on Mar. 7, 1972, which disclosure of amines is incorporated by reference herein.

Typical membranes of the first group prepared from ethylene diamine which may be employed in the process of this invention include (a) a homogeneous film about 7 mils thick of about 1200 equivalent weight perfluorosulfonic acid resin which has been chemically modified by ethylene diamine converting a depth of about 1.5 mils to the perfluorosulfonamide, (b) a homogeneous film about 7 mils thick of 1150 equivalent weight perfluorosulfonic acid resin which has been chemically modified by ethylene diamine converting a depth of about 1.5 mils to the perfluorosulfonamide, and (c) a homogeneous film about 7 mils thick of 1150 equivalent weight perfluorosulfonic acid resin which has been chemically modified by ethylene diamine converting a depth of about 1.2 mils to the perfluorosulfonamide.

For the above mentioned amine-substituted membranes, a laminated inert cloth supporting fabric may be employed.

The thickness of the laminated inert cloth supporting fabric is in the range from about 3 to about 7 and preferably from about 4 to about 5 mils. The inert cloth supporting fabric is typically comprised of polytetrafluoroethylene, rayon, or mixtures thereof.

A preferred example of a diamine substituted polymer is a perfluorosulfonic acid polymer comprised of a homogeneous film about 7 mils thick, of about 1150 equivalent weight perfluorosulfonic acid resin which has been chemically modified on one side by ethylene diamine converting a depth of about 1.5 mils of the polymer to perfluorosulfonamide. The unmodified side is laminated to a fabric of polytetrafluoroethylene resin. The fabric is characterized by having a basic weave pattern, a thread count of about 6×6 polytetrafluoroethylene, 24×24 rayon per centimeter, a denier of about 200 polytetrafluoroethylene and 50 rayon, a fabric thickness of about 4.6 mils and an open area (Optical) of about 70 percent by volume after rayon removed.

The ethylene diamine treated side of the membrane is oriented toward the cathode in the electrolytic cell.

Also included in the first group are polymers similar to the above '988 patent which are prepared as described in U.S. Pat. No. 4,085,071, supra, wherein surface sulfonyl groups of the backbone sulfonated fluorine polymers are reacted to a selected depth with a primary amine such as with heat treatment of the converted polymer to form N-monosubstituted sulfonamido groups or salts on the sulfonyl fluoride sites of the copolymer through the reaction of the primary amine.

With only surface conversion of the sulfonyl halide groups, further conversion of the remaining sulfonyl halide groups to the ionic form is most desirable. The prior art techniques of conversion of the —$SO_2X$ groups with X as previously defined may be undertaken such as by hydrolysis. The techniques set forth in Connolly and Gresham, U.S. Pat. No. 3,282,875 and/or Grot, U.S. Ser. No. 178,782 and now U.S. Pat. No. 3,784,399 may be employed. Illustratively, the unconverted sulfonyl groups of the polymer may be converted to the form —$(—SO_2NH)_mQ$ wherein Q is H, $NH_4$, cation of an alkali metal and/or cation of an alkaline earth metal and m is the valence of Q. Additionally, the unconverted sulfonyl groups may be formed to —$(SO_3)_nMe$ wherein Me is a cation and n is the valence of the cation. Preferred definitions of Q include $NH_4$ and/or cation of an alkaline earth metal particularly sodium or potassium. Preferred definitions of Me include potassium, sodium and hydrogen.

With respect to the diamine or polyamine substituted polymers of the '988 patent and the primary amine polymers of the '071 patent described above, the modifications are generally performed on only one side of the membrane. The thickness of the diamine and polyamine substituted polymers is in the range from about 4 to about 10 and preferably in the range from about 5 to about 9 mils. The depth of the modification is in the range from about 1.0 to about 7.0 and preferably from about 1.2 to about 1.5 mils.

The amine treated side of the membrane is also oriented toward the cathode.

A second group of materials suitable as membranes in the process of this invention includes perfluorosulfonic acid membrane laminates which are comprised of at least two unmodified homogeneous perfluorosulfonic acid films. Before lamination, both films are unmodified and are individually prepared in accordance with the basic '714 patent previously described.

The first film has a thickness in the range from about 0.5 to about 2 mils, of about 1500 equivalent weight perfluorosulfonic acid resin, and the second film has a thickness in the range from about 4 to about 6 mils, of about 1100 equivalent weight perfluorosulfonic acid resin.

After lamination together to form a single film, the resulting membrane is positioned in the electrolytic cell with the thinner, higher equivalent weight side of the resulting film oriented toward the catholyte chamber.

Typical laminated membranes of the second group which may be employed in the process of this invention include (a) a homogeneous film about 1 mil thick of about 1500 equivalent weight perfluorosulfonic acid resin and a homogeneous film about 5 mils thick of about 1100 equivalent weight perfluorosulfonic acid resin; (b) a homogeneous film about 1.5 mils thick of about 1500 equivalent weight perfluorosulfonic acid resin and a homogeneous film about 5 mils thick of about 1100 equivalent weight perfluorosulfonic acid resin; (c) a homogeneous film about 2 mils thick of about 1500 equivalent weight perfluorosulfonic acid resin and a homogeneous film about 4 mils thick of 1100 equivalent weight perfluorosulfonic acid resin; and (d) a homogeneous film about 1.5 mils thick of about 1500 equivalent weight perfluorosulfonic acid resin and a homogeneous film about 4 mils thick of about 110 equivalent weight perfluorosulfonic acid resin.

For selected laminated membranes, a laminated inert cloth supporting fabric may be employed. The thickness of the laminated inert cloth supporting fabric is in the range from about 3 to about 7 and preferably from about 4 to about 5 mils. The inert supporting fabric is typically comprised of polytetrafluoroethylene, rayon, or mixtures thereof.

At least one electrode is positioned within the anolyte chamber and one electrode within the catholyte chamber. For maximum exposure of the electrolytic surface, the face of the electrode should be parallel to the plane of the membrane.

Examples of materials which may be employed as an anode include commercially available platinized titanium, platinized tantalum, or platinized platinum electrodes which contain, at least on the surface of the electrodes, a deposit of platinum or titanium, platinum on tantalum or platinum on platinum. Also effective are anodes composed of graphite, or anodes comprised of a metal oxide coated substrate such as ruthenium dioxide or titanium and others as described in U.S. Pat. No. 3,632,498, issued to H. B. Beer on Jan. 4, 1972 which is incorporated herein in its entirety by reference. When such electrodes are employed as anodes, anodic chlorine overvoltage is minimized. Any electrode construction capable of effecting electrolytic production of potassium hydroxide from a brine containing potassium chloride may be employed in the process of this invention.

Examples of materials which may be employed as the cathode are carbon steel, stainless steel, nickel, nickel molybdenum alloys, nickel vanadium alloys, mixtures thereof and the like. Any cathode material that is capable of effecting the electrolytic reduction of water with either high or low hydrogen overvoltage may be used as cathode construction material in the process of this invention.

The cathode and anode may each be of either solid, felt, mesh, foraminous, packed bed, expanded metal, or other design. Any electrode configuration capable of effecting anodic electrolytic production of potassium hydroxide from a brine containing potassium chloride may be used as anodes or cathodes, respectively, in the process of this invention.

The distance between an electrode, such as the anode or the cathode, to the membrane is known as the gap distance for that electrode. The gap distance of the anode to membrane and the cathode to membrane are independently variable. Changing these respective distances concurrently or individually may affect the operational characteristics of the electrolytic cell and is reflected in the calculated current efficiency. For the process of this invention for each electrode, the electrode current efficiency is defined as the ratio of the number of chemical equivalents of product formed divided by the electrical equivalents consumed in forming that product x 100. This may be expressed mathematically by the following equation (1):

$$\% \text{ Current Efficiency} = \frac{A/B}{C/D} \times 100 \qquad (1)$$

where
- $A$ = Mass of product produced in grams.
- $B$ = Equivalent weight of product produced in grams per equivalent.
- $C$ = Quantity of electricity consumed in making desired product in ampere hours.
- $D$ = Faraday's Constant of 26.81 ampere hours per equivalent.

In general, preferably anode to membrane and preferably cathode to membrane gap distances can be defined for any concentration of potassium chloride employed as the anolyte in the membrane electrolytic cell. When using potassium chloride solution as the anolyte at a concentration in the range from about 200 to about 300 grams potassium chloride per liter, the preferable anode to membrane gap distance is in the range from about 0.1 to about 2.5 centimeters, and the preferable cathode to membrane gap distance is in the range from about 0.1 to about 1.7 centimeters.

The anolyte is comprised of an aqueous solution of potassium chloride. The solution charged to the electrolytic cell may be made by dissolving solid potassium chloride in water, preferably deionized water, or the solution may be obtained by regenerating spent solution of potassium chloride. Minor amounts of sodium chloride, sodium bromide, potassium bromide, potassium sulfate, sodium sulfate, potassium dithionate, sodium dithionate, sodium bisulfate, potassium bisulfate, $Na_3PO_4$, $K_3PO_4$ or mixtures thereof may be present. The concentration of potassium chloride ranges from about 200 to about 300 and preferably from about 250 to about 285 grams potassium chloride per liter in the anolyte feed.

The aqueous solution of potassium chloride described above is supplied to the anolyte chamber of the electrolytic cell at a concentration described above and at a flow rate in the range from about 5 to about 20 milliliters per minute.

In starting up an electrolytic cell employing a selected permselective membrane from among these previously described, the cell is first assembled employing the selected membrane. Potassium chloride solution at the desired concentration is charged to the anolyte chamber until it is substantially full, leaving sufficient space at the top to collect and remove chlorine product. An aqueous solution of alkali metal hydroxide such as potassium hydroxide, sodium hydroxide or mixtures thereof of the desired concentration is fed into the catholyte chamber until substantially full, leaving sufficient space at the top to collect and remove hydrogen gas product.

In the operation of the process of this invention, a direct current is supplied to the cell and a voltage of about 3.8 volts is impressed across the cell terminals. To initially obtain the desired concentration of potassium hydroxide, little or no alkali metal hydroxide such as potassium hydroxide solution may be withdrawn from the catholyte chamber until the desired concentration is obtained.

Alternatively, the catholyte chamber is filled with deionized water prior to the start of electrolysis. U.S. Pat. No. 4,062,743, supra, discloses general methods for starting up electrolytic cells employing alkali metal halide brines such as potassium chloride brine. During electrolysis, a portion of the spent potassium chloride solution is removed from the anolyte chamber of the cell after partial depletion. The spent solution is treated and reconstituted with fresh potassium chloride to achieve the desired feed potassium chloride concentration, and then is recycled to the cell anolyte chamber for electrolysis.

The rate of which potassium chloride solution is supplied to the anolyte chamber during electrolysis is in the range from about 2 to about 20 and preferably from about 5 to about 15 milliliters per minute at a current density of about 2 kiloamperes per square meter.

When employing a cell with an amine modified or laminated permselective membrane as in the present invention, potassium ions are transported across the membrane from the anolyte chamber into the catholyte chamber during electrolysis. The concentration of the potassium hydroxide produced in the catholyte chamber is essentially determined by the amount of water added to this chamber from a source exterior to the cell and from water transferred through the permselective membrane.

The percent depletion of KCl in the KCl brine during electrolysis is the percent KCl electrolyzed and in the range from about 5 to about 40 and preferably about 10 to about 30%.

In a preferred embodiment, the catholyte KOH concentration is maintained within the desired range by feeding water into the catholyte chamber at a rate of about 0.05 to about 0.2 milliliter per minute per kiloampere per square meter of cathode surface. The amounts of water added controls the concentration of the potassium hydroxide in the catholyte, which, in turn, affects the ion transport properties of the membrane.

Electrolysis of the potassium chloride brine is conducted at current densities of from about 1.0 to about 5.0, and preferably from about 1.5 to about 2.5 kiloamperes per square meter of anode working surface.

The operating temperature of the membrane cell is in the range from about 40° to about 150° C., and preferably of about 70° to about 100° C.

The operating pressure of the cell is essentially atmospheric. However, sub- or superatmospheric pressures may be used, if desired.

The catholyte is removed from the electrolytic cell at a KOH concentration in the range from about 300 to about 500 and preferably from about 350 to about 480 grams potassium hydroxide per liter.

After removal from the cell, the potassium hydroxide solution may be used as is or may be further concentrated by evaporation.

The concentration of potassium chloride in the catholyte product is minimal and is generally less than about 0.1 weight percent KCl. This minimal amount of potassium chloride migrates from the anolyte chamber during electrolysis.

Chlorine produced in the anolyte chamber and hydrogen produced in the catholyte chamber are recovered from the cell as formed and are recovered by well-known methods.

The following examples are presented to define the invention more fully without any intention of being limited thereby. All parts and percentages are by weight unless indicated otherwise.

EXAMPLE 1

Potassium hydroxide, hydrogen gas and chlorine gas were continuously prepared in a divided flow-through polytetrafluoroethylene cell having an anolyte chamber containing an anode and a catholyte chamber containing a cathode and exterior dimensions which were about 23 centimeters in height, about 13 centimeters in width, and about 9 centimeters in depth. An ethylene diamine modified permselective cation exchange membrane as described below was employed to separate the catholyte chamber and the anolyte chamber.

An anode was positioned vertically in the anolyte chamber. The anode was a 2¾ inch by 2¾ inch section of metallic mesh comprised of a titanium substrate coated with a mixed oxide of ruthenium oxide and titanium oxide. The coating was obtained by painting the titanium substrate with butyl titanate and ruthenium trichloride and then oven fired to form the oxides. The finished anode was of the type described in U.S. Pat. No. 3,632,498, supra, was secured on one side to a 5/16 inch diameter circular titanium rod centrally inserted through one side of the anolyte chamber.

A cathode was positioned vertically in the catholyte chamber. The cathode was a 2¾ inch by 2¾ inch section of nickel wire mesh. The cathode mesh was secured on one side to 5/16 inch diameter circular nickel rod which extended into the catholyte chamber through the opposite side wall of the catholyte chamber.

The membrane employed was a homogeneous film of cationic exchange membrane (about 7 mils thick), about 1150 equivalent weight perfluorosulfonic acid resin which had been chemically modified by ethylene diamine, converting a depth of about 1.5 mils to perfluorosulfonamide, and laminated with a fabric backing of polytetrafluoroethylene resin and rayon. The fabric had a basic weave pattern, a thread count of about 6×6 polytetrafluoroethylene, 24×24 rayon per centimeter, a denier of about 200 polytetrafluoroethylene and 50 rayon, a fabric thickness of about 4.6 mils and an open area (Optical) of about 70 percent by volume after rayon removed.

The membrane was soaked for about 16 hours in about a 25 percent by weight aqueous sodium hydroxide solution which was maintained at a temperature of about 85° C.

Thereafter, the membrane was removed from the sodium hydroxide solution and while still damp with the sodium hydroxide solution was placed in the cell.

The membrane was positioned vertically in the center of the cell and formed a catholyte chamber which was about 7.6 centimeters in width, about 1.7 centimeters in depth, and about 17.8 centimeters in height and an anolyte chamber which was about 7.6 centimeters in width, about 1.9 centimeters in depth, and about 17.8 centimeters in height.

Both anode and cathode were positioned parallel to the cell membrane. The ethylene diamine modified side of the membrane was oriented toward the catholyte chamber. The anode to membrane gap distance was set at about 0.3 centimeter and the cathode to membrane gap distance was set at about 0.3 centimeter. The cell was fully assembled.

The anolyte chamber was filled with a saturated potassium chloride solution containing about 280 grams potassium chloride per liter of solution. The catholyte chamber was filled with an aqueous solution of sodium hydroxide containing about 30 percent sodium hydroxide by weight.

The direct current electrical leads were connected to the cell and the current was turned on at a current density of about 0.1 kiloampere per meter square. The cell temperature was increased from about 25° to about 55° C. at a rate about linear with time of about 8C.° per hour by employing an electrical resistance heater in the catholyte chamber. The cell was held at the above conditions for about 16 hours before cell operation.

The cell was further warmed to an operating temperature of about 85° C. at a rate about linear with time of about 8C.° per hour. The current was gradually increased about every 15 minutes by a current density increment of about 0.2 kiloampere per meter square to a final current density of about 2.0 kiloamperes per meter square.

During electrolysis, the anolyte solution was continuously supplied at the rate of about twelve millimeters per minute to the anolyte chamber of the electrolytic cell by regulating the flow from a head tank of anolyte solution. A receiving tank was connected to the outlet process connection on the anolyte chamber to collect depleted potassium chloride brine for treatment, regeneration and subsequent reuse as feed potassium chloride to the electrolytic cell. In addition, a storage flask was connected to the outlet process connection on the catholyte chamber to collect product potassium hydroxide. A source of deionized water was connected to a process inlet of the catholyte chamber. The vapor outlet of the anolyte chamber was connected to a vented scrubber to collect chlorine generated in the anolyte chamber of the cell. Hydrogen generated in the catholyte chamber of the cell was collected in a process hydrogen header system.

After electrolysis was started in the cell, and the concentration of KOH in the catholyte was in the range from about 300 to about 500 grams KOH per liter of solution, deionized water was supplied to the catholyte chamber at about 0.35 milliliter per minute.

The portion of the catholyte containing the sodium hydroxide employed during start-up of the cell was collected and segregated from the catholyte product potassium hydroxide.

Spent potassium chloride was continuously removed from the anolyte chamber and had a concentration of about 240 grams potassium chloride per liter of solution.

The operating temperature of the cell was maintained at about 85° C. and the operating pressure of the cell was about atmospheric. Cell voltage was about 3.75 volts.

After above five hours (about 51 ampere hour of electrical energy), electrolysis was stopped. During that time, about 337 grams of potassium hydroxide solution having a concentration of about 400 grams KOH per liter was prepared. The cell current efficiency was calculated using equation (1) on the basis of the potassium hydroxide produced and was calculated to be about 96.8 percent.

Table I presents selected operating conditions and calculated catholyte current efficiencies for a series of similar tests as Examples 2–6 of electrolysis of potassium chloride solutions employed to prepare aqueous solutions of KOH of varying concentrations, utilizing the previously described electrolytic cell and ethylene diamine modified perfluorosulfonic acid membrane of Example 1.

The percent depletion KCl in KCl brine during electrolysis was about 14.3 percent.

TABLE I

| Electrolysis of KCl at a Current Density of About 2 KA/M$^2$ at About 85° C. | | | | | |
|---|---|---|---|---|---|
| Example | 2 | 3 | 4 | 5 | 6 |
| Water (mls per minute) | 0.7 | 0.5 | 0.4 | 0.3 | 0.13 |
| Voltage (volts) | 3.52 | 3.64 | 3.90 | 3.94 | 4.14 |
| Spent KCl Concentration (grams per liter) | 263 | 245 | 263 | 244 | 269 |
| Fresh KCl Concentration (grams per liter) | 280 | 280 | 280 | 280 | 280 |
| Product KOH Concentration (grams per liter) | 305 | 355 | 435 | 460 | 476 |
| Catholyte Current Efficiency (%) | 97.5 | 97.5 | 92.4 | 90.0 | 87.2 |
| Percent depletion KCl in KCl brine during electrolysis | 6.1 | 8.9 | 6.1 | 9.3 | 3.9 |

COMPARATIVE EXAMPLE A

An electrolytic cell was operated under similar conditions as Examples 1–6 except that the membrane of the cell of Comparative Example A was an unmodified cation permselective membrane of about 7 mils thickness having an equivalent weight of about 1200 supported by a layer of polytetrafluoroethylene cloth as taught in the prior art.

Current efficiencies were calculated for catholytes of various KOH concentrations, as shown in Table II.

TABLE II

| Electrolysis of KCl at a Current Density of about 2KA/M$^2$ | |
|---|---|
| Catholyte Concentration of KOH (grams per liter) | Cathode Current Efficiency |
| 325 | 80 |
| 350 | 80 |
| 400 | 80 |
| 425 | 84 |

TABLE II-continued

Electrolysis of KCl at a Current Density of about 2KA/M$^2$

| Catholyte Concentration of KOH (grams per liter) | Cathode Current Efficiency |
|---|---|
| 440 | 87 |
| 465 | 86 |
| 475 | 84 |
| 485 | 80 |

A comparison of these results with Examples 1–6 shows that the catholyte current efficiency for the ethylene diamine modified perfluorosulfonic acid membrane of this invention as shown in Examples 1–4 was about 92 to about 98 percent in a KOH concentration range of about 300 to about 435 grams per liter. As the KOH concentration was increased in the range from about 460 to about 476 grams per liter as shown in Examples 5–6, the catholyte current efficiency decreased gradually with increasing KOH strength to about 87.2 percent.

In marked contrast, the catholyte current efficiency for the modified perfluorosulfonic acid membrane of Comparative Example A was about 80 percent in the KOH concentration range of about 325 to about 400 grams KOH per liter. As the KOH concentration was increased in the range greater than about 400 to about 500 grams per liter, the calculated catholyte current efficiency increased from 80 percent to a maximum of about 87 percent at about 420 grams KOH per liter. The calculated catholyte current efficiency continued to decrease with increasing KOH concentration.

Thus it can be seen that over the concentration range of about 325 to about 400 grams KOH per liter, the catholyte current efficiency of the membranes of this invention was at least about 17 percentage points greater than the current efficiency of the prior art membrane. Throughout the other concentration ranges, the ethylene diamine modified membrane of this invention was at least about 4 percentage points and generally as high as about 8 percentage points greater than the catholyte current efficiency of prior art membranes.

What is claimed is:

1. In a process for the preparation of potassium hydroxide, chlorine and hydrogen in an electrolytic cell by electrolysis of potassium chloride brine, said cell having an anolyte chamber containing an anode and a catholyte chamber containing a cathode and wherein said anolyte chamber is separated from said catholyte chamber by a cationic permselective membrane, the improvement which comprises employing as said membrane a membrane selected from the group consisting of:
(i) an amine substituted perfluorosulfonic acid membrane, and
(ii) a single film laminate membrane comprised of at least two perfluorosulfonic acid membranes,
and wherein the potassium hydroxide concentration in said catholyte chamber is in the range from about 300 to about 500 grams KOH per liter and wherein said membrane is laminated to a fabric of polytetrafluoroethylene and rayon.

2. The process of claim 1, wherein said amine substituted membrane is a primary amine substituted membrane.

3. The process of claim 1, wherein said amine substituted membrane is a diamine substituted membrane.

4. The process of claim 1, wherein said amine substituted membrane is a polyamine substituted membrane.

5. The process of claims 3 or 4 wherein said diamine and said polyamine is comprised of at least two amino groups with one primary amino group and the second amino group either primary or secondary.

6. The process of claim 5, wherein said amine substituted membrane is prepared by reacting said amine with a precursor sulfonyl fluoride polymer wherein pendant sulfonyl fluoride groups react to form N-monosubstituted sulfonamido groups or salts thereof.

7. The process of claim 6, wherein the thickness of said amine substituted membrane is in the range from about 4 to about 10 mils.

8. The process of claim 7 wherein the thickness of said amine substituted polymer is in the range from about 5 to about 9 mils.

9. The process of claim 8 wherein said amine is reacted with said precursor sulfonyl fluoride polymer to a depth in the range from about 0.5 to about 7 mils.

10. The process of claim 9 wherein said amine is reacted with said precursor sulfonyl fluoride polymer to a depth in the range from about 1 to about 2 mils.

11. The process of claim 10 wherein said diamine is ethylene diamine.

12. The process of claim 1, wherein said laminate of perfluorosulfonic acid membranes is comprised of at least two unmodified homogeneous perfluorosulfonic acid films.

13. The process of claim 12, wherein said laminated perfluorosulfonic acid membranes are comprised of a first membrane having a thickness in the range from about 1 to about 2 mils, of about 1500 equivalent weight perfluorosulfonic acid resin, and the second membrane has a thickness in the range from about 4 to about 5 mils of about 1100 equivalent weight perfluorosulfonic acid resin.

14. The process of claim 13, wherein said laminate of perfluorosulfonic acid membrane is comprised of a first membrane having a thickness of about 2 mils of about 1500 equivalent weight perfluorosulfonic acid resin and the second membrane has a thickness of about 4 mils of about 1100 equivalent weight perfluorosulfonic acid resin.

15. The process of claim 13, wherein said laminate of perfluorosulfonic acid membrane is comprised of a first membrane having a thickness of about 1 mil of about 1500 equivalent weight perfluorosulfonic acid resin and the second membrane has a thickness of about 5 mils of about 1100 equivalent weight perfluorosulfonic acid resin.

16. The process of claim 13, wherein said laminate of perfluorosulfonic acid membrane is comprised of a first membrane having a thickness of about 1.5 mils of about 1500 equivalent weight perfluorosulfonic acid resin and the second membrane has a thickness of about 5 mils of about 1100 equivalent weight perfluorosulfonic acid resin.

17. The process of claim 1, wherein said membrane is a diamine substituted membrane chemically modified on one side by amine to a depth in the range from about 0.5 to about 7 mils.

18. The process of claim 17, wherein said membrane is a diamine substituted membrane comprised of a homogeneous film about 7 mils thick, of about 1150 equivalent weight perfluorosulfonic acid resin which has been chemically modified on one side by ethylene diamine converting a depth of about 1.5 mils of the polymer to perfluorosulfonamide.

19. The process of claim 18, wherein said fabric is characterized by having a basic weave pattern, a thread count of about 6×6 polytetrafluoroethylene, 24×24 rayon per centimeter, a denier of about 200 polytetrafluoroethylene and 50 rayon, a fabric thickness of about 4.6 mils and an open area (Optical) of about 70 percent by volume after rayon removed.

20. The process of claim 18, wherein said diamine substituted membrane is a perfluorosulfonic acid polymer comprised of a homogeneous film about 7 mils thick, of about 1200 equivalent weight perfluorosulfonic acid resin which has been chemically modified on one side by ethylene diamine converting a depth of about 1.5 mils of the polymer to perfluorosulfonamide.

21. The process of claim 18, wherein said diamine substituted membrane is a perfluorosulfonic acid polymer comprised of a homogeneous film about 7 mils thick, of about 1150 equivalent weight perfluorosulfonic acid resin which has been chemically modified on one side by ethylene diamine converting a depth of about 1.2 mils of the polymer to perfluorosulfonamide.

22. In a process for the preparation of potassium hydroxide, chlorine and hydrogen in an electrolytic cell by electrolysis of potassium chloride brine, said cell having an anolyte chamber containing an anode and a catholyte chamber containing a cathode and wherein said anolyte chamber is separated from said catholyte chamber by a cationic permselective membrane, the improvement which comprises employing as said membrane a perfluorosulfonic acid membrane modified on one side with an amine and having the unmodified side laminated to a fabric of polytetrafluoroethylene and rayon wherein the concentration of potassium hydroxide is in the range from about 300 to about 500 grams per liter.

23. The process of claim 22, wherein said depth is in the range from about 1 to about 2 mils.

* * * * *